3,605,309
ILLUMINATED DISPLAY HAVING REMOTE LIGHT SOURCE
Gerald A. Beaty, Norristown, Pa., and Frederick L. Lynch, Andover, Mass., assignors to Elinore J. Beaty, Meadwood, Del., and American Cyanamid Company, Stamford, Conn.
Filed Sept. 19, 1966, Ser. No. 580,250
Int. Cl. G09f 13/00
U.S. Cl. 40—130B                                          5 Claims

ABSTRACT OF THE DISCLOSURE

In an illuminated display, useful for advertising and as a work of art, the face of the display is suspended above a remote source of substantially parallel light rays and comprises at least one light transmitting portion exterior to a body arranged to receive the parallel rays, including a deflector adapted to direct the parallel rays so that they impinge upon the interior of the light transmitting portion, the illuminated face possessing the esthetic effect, to an observer, of being suspended in air on rays of light. The deflector can be adjustable (e.g. tunable) and can comprise two hinged reflective faces which are capable of adjustment by raising or lowering a hinge linkage connecting the two faces. The deflector can have a corrugated surface comprising both primary and secondary reflective surfaces, the primary reflective surface being positioned so as to directly receive the parallel light rays and direct them toward the face and, the secondary surface being positioned so as to receive light reflected from the interior of the face and redirect it back on to the interior surface of the light-transmitting portion of the face.

---

This invention relates to an illuminated display, useful for advertising and as a work of art, wherein the face of the display is suspended above a source of substantially parallel light rays and comprises at least one light transmitting portion, exterior to a body arranged to receive the parallel light, including a deflector adapted to direct the parallel light rays so that they impinge upon the interior surface of the light transmitting portion, the illuminated face possessing the esthetic effect, to an observer, of being suspended in air on rays of light.

The invention also includes certain novel deflectors which can be incorporated in said display in order to greatly improve the efficiency of directing light toward the illuminated face. When our deflectors comprise at least two reflective surfaces they can also function as light beam splitters. Certain of our deflectors also possess the ability of being adjustable or tuneable and thus facilitate the initial assembly of the display and also facilitate changing the face or the message.

The invention also relates to the incorporation of an artificial atmosphere, such as smoke, fog or tinsel, in order to enhance the esthetic effect. This artificial atmosphere can be primarily reflective or primarily refractive or a combination thereof and can also be absorptive to some degree, as when color is imparted thereto.

In a preferred display, a source of highly concentrated parallel light rays, as quartz iodine lamp, including a parabolic reflector and a spherical reflector over the light emitting element, is the source of said parallel light and the display face and the light-receiving body comprise an assembly (which can be rotated) which is suspended above the light source such as by means of a tower comprising structural framework consisting essentially of tubular members joined by triodetic connectors.

It is usual in the art of fabricating illuminated displays to incorporate a light source within the display (see, for example, U.S. Pat. No. 1,572,016). The art has also incorporated deflectors with such light source containing displays in order to more efficiently direct the light to the display message (see, for example, U.S. Pat. No, 2,075,764).

Although U.S. Pat. No. 1,545,009 shows the illumination, from a somewhat remote fixed point source of light, of a street-level mushroom traffic indicator which incorporates a light deflector, we know of no prior art teaching of an illuminated display suspended above a remote source of substantially parallel light rays, the face of said display comprising at least one light transmitting portion exterior to an assembly arranged to receive said parallel rays including a deflector adapted to direct said parallel rays so that they impinge upon the interior surface of said light transmitting portion, said illuminated face possessing the esthetic effect (at night) to an observer below said display of being suspended in air on said rays of light.

Figure 1:
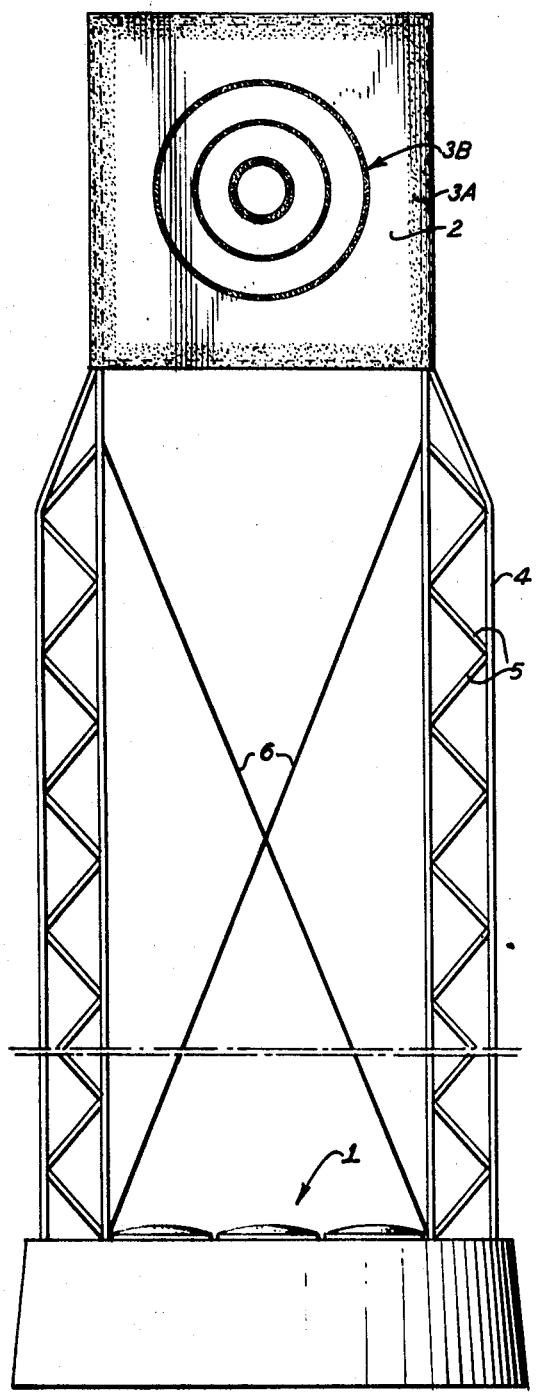
Figure 2:
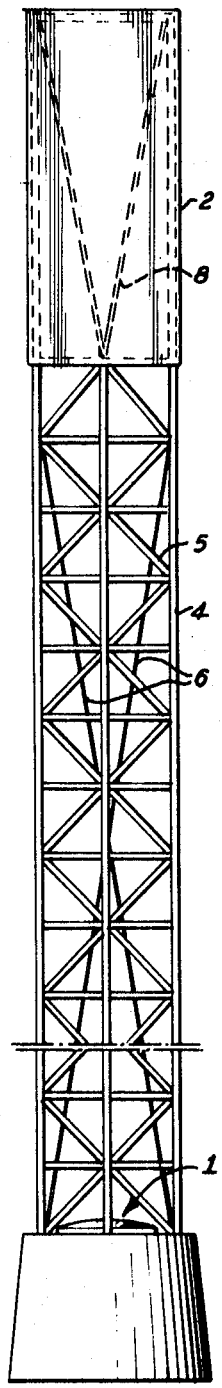

As an example of our invention, in the drawings, FIG. 1 represents a front view of one embodiment of our illuminated display. FIG. 2 is a side view of the same display as FIG. 1.

Figure 5:
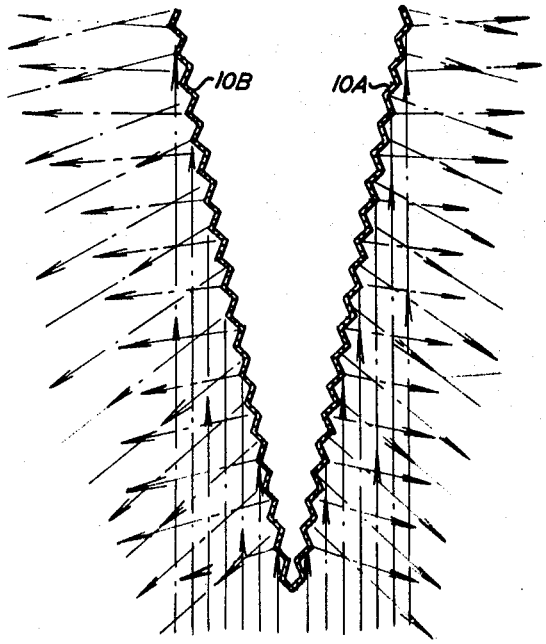

Referring by characters to the drawings, 1 represents a source of substantially parallel light rays, such as an aircraft searchlight (incorporating a parabolic reflector) or a carbon arc projection light, and lenses, such as those used in drive-in motion picture theatres. The light from source 1 travels upward to the display assembly which includes a light transmitting portion, for example, a molded acrylic plastic face having a translucent border area 3–A (which can be colored) and a transparent area 2 (which can be colored) upon which is written an opaque message 3–B (which can be colored). The light rays which impinge upon deflector 8 (which may be reflective or refractive as a prism) are directed toward the interior surface of said light transmitting face. When, as illustrated in FIG. 5, the deflector comprises at least two reflective (and/or refractive) surfaces which are joined at other than a 180° angle, the deflector also can function as a light-beam splitter (or divider), that is, it can proportion the light between two or more display faces. The display assembly containing the light transmitting portion is suspended a considerable distance, say 40 to 100 feet, above the light source by means of a tower constructed of a structural framework consisting of tubular members 4 connected by triodetic connectors 5. Such connectors are shown in Architectural Forum, November 1963, p. 185. Additional stability can be imparted to the tower by a tensile structural member 6, such as stretched wires which intersect at a multifaceted reflective member 7, such as a reflectron prism.

Figure 3:
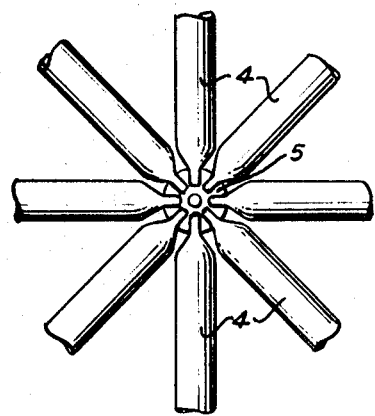

FIG. 3 is a detail of a portion of the structural framework showing how the tubular members are joined by the triodetic connectors.

Figure 4:
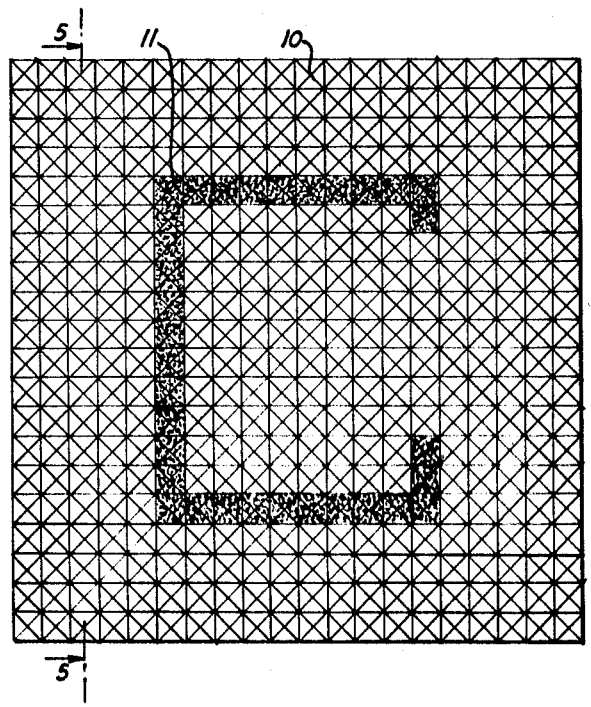

FIG. 4 shows a front view of one type of deflector having an embossed surface 10 which bears an opaque message 11. This deflector (which need not bear a message) is constructed of embossed metal or of plastic which is formed or cut to create the special reflective pattern, such as the Fresnal lens, shown in FIG. 4. The parallel rays which intercept this patterned surface are redirected in many directions and in particular at narrow downward angles which are most readily seen by an observer on the ground.

FIG. 5 is a side view of such a patterned deflector, and shows the multi-directional pattern of the directed rays and also the proportioning (or splitting) of the beam of parallel light. The pattern of FIGS. 4 and 5 can also be horizontally corrugated, as in a washboard surface.

Figure 6:
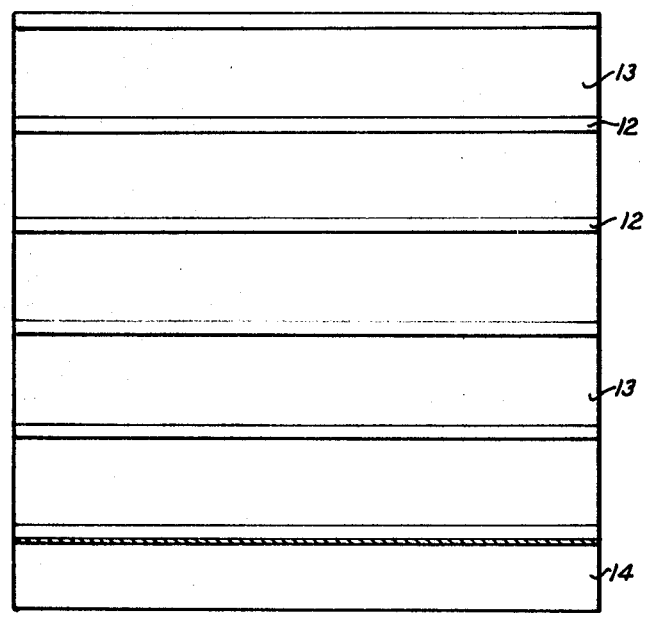
Figure 7:
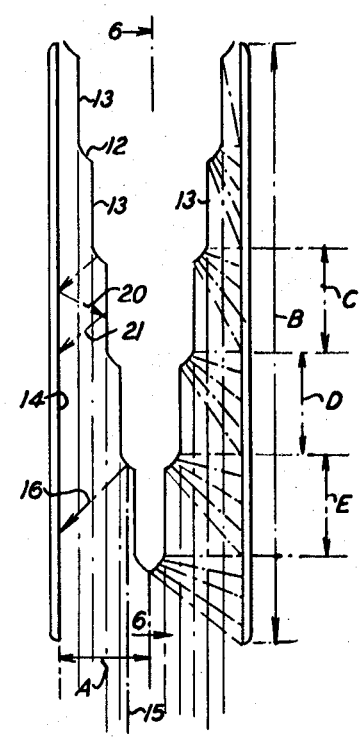

Another deflector is that shown in front view in FIG. 6. This deflector utilizes both primary deflective surfaces 12, and secondary deflective surfaces 13. FIG. 7 is a side view of the deflector of FIG. 6 and aids in illustrating the function of the two types of deflective surface. Taking just one side of the deflector, it can be seen that the area of the entering parallel rays (which is the length of the sign multiplied by distance A) must be redirected by the deflector to cover a much larger area, namely, the length of the sign times the height of the sign B.

This direction is primarily effected by the curved primary deflective surface 12, which is preferably concave and shaped so as to direct the rays over areas such as C, D, and E, which are substantially larger than the curved primary deflective surface. The secondary deflective surfaces capture the smaller proportion of light which is reflected from the interior of the face back toward the deflector. For example, an entering ray of parallel light 15 impinges upon a primary deflective surface and is directed 16 toward the face 14. However, some such directed rays strike the interior of the face 14 at an angle such that they are reflected 20 rather than transmitted through the face. Such a reflected ray 20 upon striking the primary reflective surface 13 is redirected 21 toward the face.

Figure 8:
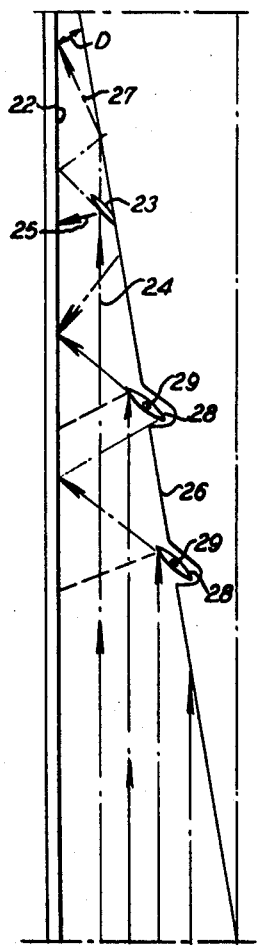

FIG. 8 shows another type of deflector wherein the primary deflective surface is a stationary curved slat 23 or a movable curved slat 28, which may be movable about a pivot 29 or may be constructed to function after the manner of a venetian blind. The slats, whether movable or stationary (or a combination thereof) are positioned at a sufficient distance, in proportion to their area, so that substantially all of the entering parallel rays strike them rather than the secondary reflective surface 26. It can be seen that an entering ray 24 which strikes the curved deflective surface 23 is directed 25 toward face 22 at an angle such that it will be transmitted through the light transmitting portion of the face. In contrast, if deflector 23 were not present, ray 24 would strike the primary reflective surface 26 and be deflected 27 at an angle D so acute that once transmitted through the face, it would be not seen by an observer on the ground.

Figure 9:
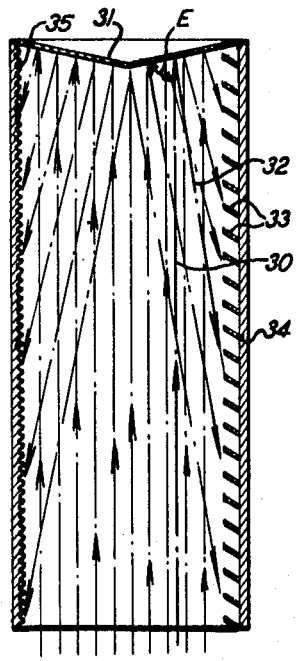

FIG. 9 shows a deflector 31 which is at an angle such tha the angle of incidence to the parallel ray 30 is less than 45°, whereas the deflectors depicted in the previous figures are such that the angle of incidence is greater than 45°. FIG. 9 also shows the use of an embossed or corrugated patterned surface 35 on the interior of the face 34. This corrugation or embossing acts as a light trap and increases the efficiency of the light capture by reducing the proportion of the light which is reflected away from the face, and also increases the illumination to an observer below by diffusing the light rays. Another type of light trap 33 is a slat which runs the width of the sign and which prevents a directed ray 32 from striking the face 34 at an acute angle and thus being redirected toward the ground, and instead, directs it through the face. A coating, as a rippled polyurethane paint, can also aid in trapping light. An etched or matt interior surface also aids in trapping light.

Figure 10:
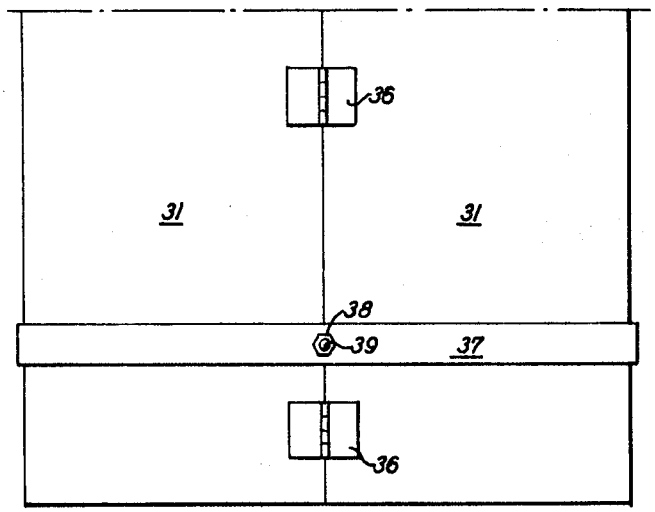
Figure 11:
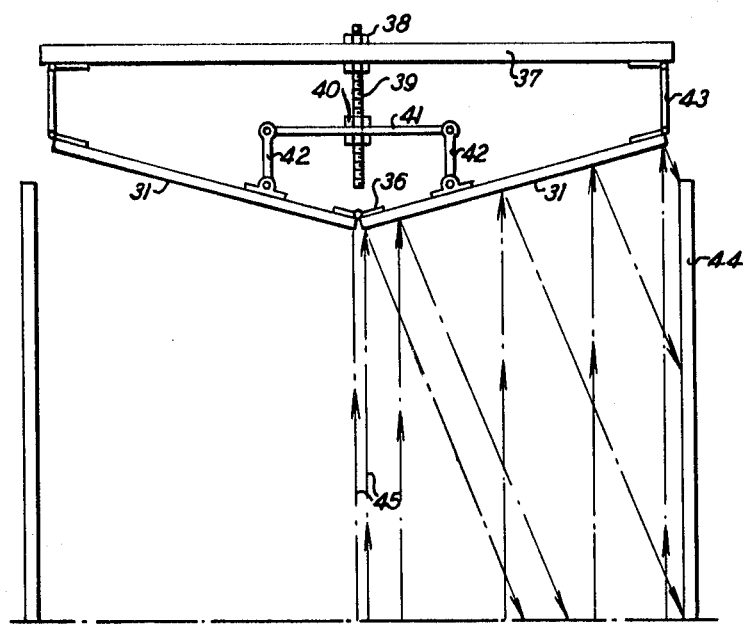

FIG. 10 shows a top view and FIG. 11 shows a side view of a tuneable or adjustable deflector. A tuneable deflector greatly facilitates the adjustments which frequently must be made when a display is initially assembled and ready tuneability also increases the flexibility of an existing display because it allows adjustment to be made in the lighting as sign faces or messages are changed.

In the embodiment of the tuneable deflector shown in the drawings, two reflective deflector faces 31 joined by hinges 36 are attached to the top of the face containing assembly 44 by a cross member 37 and a nut 38 containing a threaded bar 39 attached by a nut 40 to a floating crossbar 41 and hinged linkages 42. The extremities of the reflective faces are further joined to the stationary crossbar 37 by the outer hinged linkages 43. As the hinged linkage 42 is raised by raising the position of the nut 40, the angle between the two reflective faces approaches horizontal and the entering parallel light ray 45 strikes the face 31 at a less obtuse angle A. Conversely, as nut 40 is lowered the angle between the two reflective faces approaches 180° and angle A approaches 90°.

It can be seen that the primary function of a light deflector is to collect the maximum amount of the impinging light rays and direct these rays toward the light transmitting portion of the display face. In many instances the deflector also performs the function of apportioning the incident light between a plurality of light transmitting portions of the face. In some cases it is desirable that the deflector also diffuse the light rays to some extent or concentrate a portion thereof.

Figure 12:
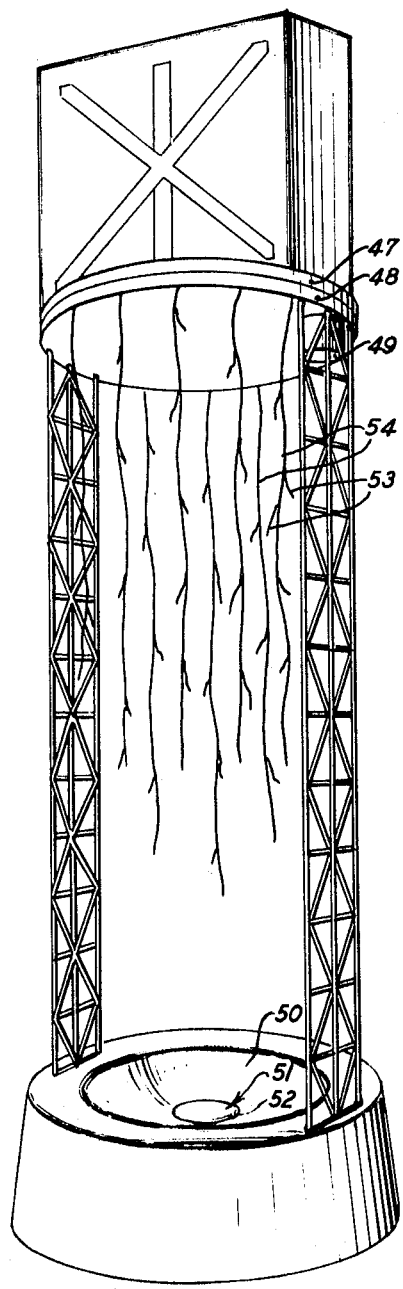

Another embodiment of our illuminated display is shown in FIG. 12 wherein by utilizing a fixed ring 48 and a rotating ring 47, driven by a motor and gear reducing drive 49, the deflector and light transmitting face are rotatable about an axis. This figure also shows an artificial atmopshere created by reflective ribbons 53 and 54. The ribbon 53 can hang in relatively straight lengths or can be twisted, as into a spiral. Shorter pieces of reflective or refractive material (which can be colored) can also be fastened to the long, vertical hanging ribbon 54. Also shown in FIG. 12 is a single point source of light 51, which is concentrated into a relatively narrow beam of substantially parallel light rays by means of a parabolic reflector 50 and a spherical reflector 52, suspended about the point source so as to disperse the concentrated light at the center of the source.

The light source 1 may comprise a suitable number of individual light-producing devices according to the size and degree of illumination required.

One type of light source which is especially adapted to give high illumination and parallel rays of light is the quartz iodide lamp. This is described in a bulletin of Sylvania Electric Products Inc., No. OL 104/250. For a sign having a surface area of 8 x 16 feet on each side we contemplete the use of two rows of lamps containing five lamps in each row. These are preferably placed part way up the supporting structure so that the intense light source will not be seen directly by anyone who would otherwise be blinded by it.

We claim:

1. A tuneable light deflector having at least one primary and at least one secondary reflective surface, said primary reflective surface being positioned so as to directly receive parallel light rays and direct said rays toward a face member opposed to said primary surface, said secondary reflective surface being positioned so as to receive light reflected from the surface of said face member opposed to said primary reflective surface and redirect it back on to the interior surface of the light transmitting portion of said face, said primary reflective surface comprising curved moveable reflective slats shaped so as to direct said rays over an area which is substantially larger than the area of said primary reflective surface and wherein the tuning is effected by moving said slats.

2. A deflector as in claim 1 wherein at least one of said slats contains a message on at least one surface and said slat is capable of being positioned such that said message can be obscured from view.

3. A deflector according to claim 1 wherein said slats are positioned at a sufficient distance, in proportion to their area, so that substantially all of said directly received parallel light rays strike said slats rather than said secondary reflective surface.

4. A combination of a display face and a light deflector having a corrugated surface, said display face having a light transmitting portion and said deflector having both primary and secondary reflective surfaces, said primary reflective surface being positioned so as to directly receive parallel light rays and direct them toward an opposing portion of said display face and said secondary surface being positioned so as to receive light reflected from said opposing portion of said face and redirect it back on to the light transmitting portion of said face.

5. A deflector according to claim 4, wherein said primary surface is curved and has a small area compared to the area of said secondary surface and said secondary surface is flat and at an angle substantially parallel to said parallel rays of light.

References Cited
UNITED STATES PATENTS

| | | | |
|---|---|---|---|
| 881,597 | 3/1908 | Lord | 240—41.1 |
| 1,632,254 | 6/1927 | Vinogradov | 350—299 |
| 2,471,954 | 5/1949 | Harvey | 240—103 |
| 3,294,962 | 12/1966 | Hilzen | 240—41.1 |
| 543,730 | 7/1895 | Heap | 240—1.2X |
| 1,649,547 | 11/1927 | Schnormeier | 40—133 |
| 1,740,228 | 12/1929 | De Francia | 40—133 |

FOREIGN PATENTS

| | | | |
|---|---|---|---|
| 651,572 | 10/1928 | France | 40—130 |
| 762,797 | 1/1934 | France | 40—133 |
| 4,579 | 2/1914 | Great Britain | 40—133 |
| 302,703 | 12/1928 | Great Britain | 40—130 |
| 346,700 | 4/1931 | Great Britain | 40—130 |
| 279,690 | 11/1930 | Italy | 40—130 |

ROBERT W. MICHELL, Primary Examiner

W. J. CONTRERAS, Assistant Examiner